United States Patent
Sumiyoshi et al.

[11] 4,256,063
[45] Mar. 17, 1981

[54] INTAKE SYSTEM OF A MULTI-CYLINDER INTERNAL COMBUSTION ENGINE

[75] Inventors: Masaharu Sumiyoshi; Setsuro Sekiya; Katsuhiko Motosugi, all of Toyota, Japan

[73] Assignee: Toyota Jidosha Kogyo Kabushiki Kaisha, Toyota, Japan

[21] Appl. No.: 22,481

[22] Filed: Mar. 21, 1979

[30] Foreign Application Priority Data

Apr. 21, 1978 [JP] Japan ................................ 53-46700

[51] Int. Cl.³ .......................................... F02B 15/00
[52] U.S. Cl. ................................................ 123/52 M
[58] Field of Search .............. 123/52 M, 52 MV, 127, 123/75 B

[56] References Cited

U.S. PATENT DOCUMENTS

| | | |
|---|---|---|
| 3,171,395 | 3/1965 | Bartholomew .............. 123/52 M X |
| 3,318,292 | 5/1967 | Hideg .............. 123/52 M X |
| 3,717,131 | 2/1973 | Chana et al. .................. 123/52 MV |
| 3,809,032 | 5/1974 | Morris ....................... 123/52 MV X |
| 4,114,572 | 9/1978 | Matsuda et al. ..................... 123/127 |

Primary Examiner—Charles E. Phillips
Attorney, Agent, or Firm—Kenyon & Kenyon

[57] ABSTRACT

A multi-cylinder engine comprising an intake manifold forming therein a main and an auxiliary intake passage, which are equipped with a main and an auxiliary carburetor, respectively. A second throttle valve is provided for each cylinder. Each of the secondary throttle valves is arranged in the respective manifold branch forming therein the main intake passage. Each of auxiliary branch intake passages branched off from the auxiliary intake passage opens into the respective intake port at a position near the intake valve. A primary throttle valve is arranged in the auxiliary intake passage and opened in accordance with increase in level of the load of an engine. The secondary throttle valves are opened after the opening degree of the primary throttle valve is increased beyond a predetermined opening degree.

20 Claims, 5 Drawing Figures

INTAKE SYSTEM OF A MULTI-CYLINDER INTERNAL COMBUSTION ENGINE

DESCRIPTION OF THE INVENTION

The present invention relates to an intake system for a multi-cylinder internal combustion engine.

Particularly in a gasoline engine, in order to obtain an improvement in the output power of the engine by increasing its volumetric efficiency when it is operating at a high speed under a heavy load, the shape of an intake port must be constructed so that it has minimal flow resistance. Since a strong turbulence is spontaneously created in the combustion chamber of the engine when the engine is operating at a high speed under a heavy load, the burning velocity is advantageously increased. However, when the same engine is operating at a low speed, sufficient turbulence is not created in the combustion chamber, thus resulting in a problem that the desired increase in the burning velocity is not obtained.

One prior art method of creating a strong turbulence in the combustion chamber when an engine is operating at a low speed creates a swirl motion in the combustion chamber by using a helical intake port or by using a shroud valve. However, since the flow resistance is increased, volumetric efficiency is reduced. Consequently, in order to increase the burning velocity when an engine is operating at a low speed while ensuring a high volumetric efficiency when an engine is operating at a high speed under a heavy load, it is necessary to both form an intake port so that it has minimal flow resistance and, at the same time, create a strong turbulence in the combustion chamber when an engine is operating at a low speed.

When an engine is operating at a low speed under a light load, the velocity of air flowing in the venturi of the carburetor is low. Consequently, since the difference in speed between the fuel flowing from the fuel nozzle and the air flowing in the venturi is small, the liquid fuel does not fully divide into fine particles. As a result of this, a large amount of fuel is fed into the cylinder in the form of a liquid, thereby resulting in poor and incomplete combustion. In a conventional engine, since the portion of the intake passage which is located downstream of the throttle valve has a relatively large volume, good responsiveness of the engine to the accelerating operation cannot be obtained. Furthermore, since the portion of the intake passage located downstream of the throttle valve has a relatively large inner surface area, a large amount of fuel adheres onto the inner surface of the intake passage. Consequently, when the engine is decelerated so that the level of vacuum in the intake passage is rapidly increased, a large amount of the fuel adhering onto the inner surface of the intake passage is vaporized. As a result of this, an excessively rich mixture is temporarily fed into the cylinder, thereby resulting in an increase in the amount of unburned HC in the exhaust.

An object of the present invention is to provide a multi-cylinder engine in which the above-mentioned various problems are simultaneously solved by improving an intake system positioned between the carburetor and the combustion chamber.

According to the present invention, there is provided a multi-cylinder internal combustion engine having a plurality of cylinders, each having a combustion chamber and an intake valve, a main intake passage common to at least two cylinders and comprising an inlet, and at least two main branch intake passages branched off from the main intake passage. Each of the main branch intake passages is connected to a respective combustion chamber via the corresponding intake valve. A main fuel supply is arranged in the inlet of the main intake passage and an auxiliary intake passage which is common to the two cylinders and includes an inlet and at least two auxiliary branch intake passages is branched off from the auxiliary intake passage. Each of the auxiliary branch intake passages has an outlet which opens into the respective main branch intake passage. An auxiliary fuel supply is arranged in the inlet of the auxiliary intake passage. Primary valve means are arranged in the auxiliary intake passage and are opened in accordance with the increase in level of the load of an engine. Furthermore, secondary valve means are arranged in the main branch intake passages and are operatively connected to the primary valve means for opening the secondary valve means after the opening degree of the primary valve means is increased beyond a predetermined opening degree.

The present invention may be more fully understood from the description of a preferred embodiment of the invention set forth below, together with the accompanying drawings.

DESCRIPTION OF A PREFERRED EMBODIMENT

Figure 1:
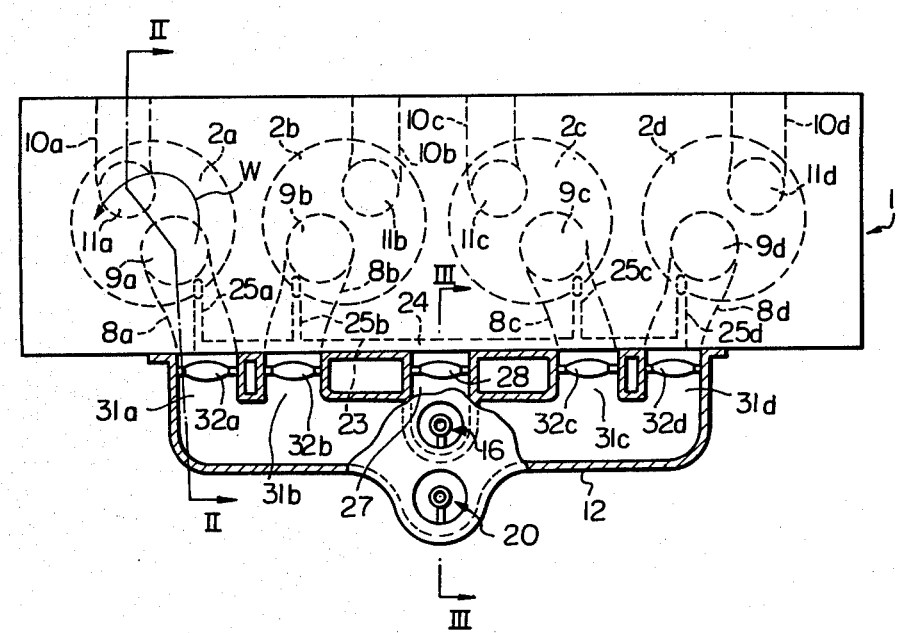
FIG. 1 is a plan view, partly in cross-section, of an engine according to the present invention.
Figure 2:
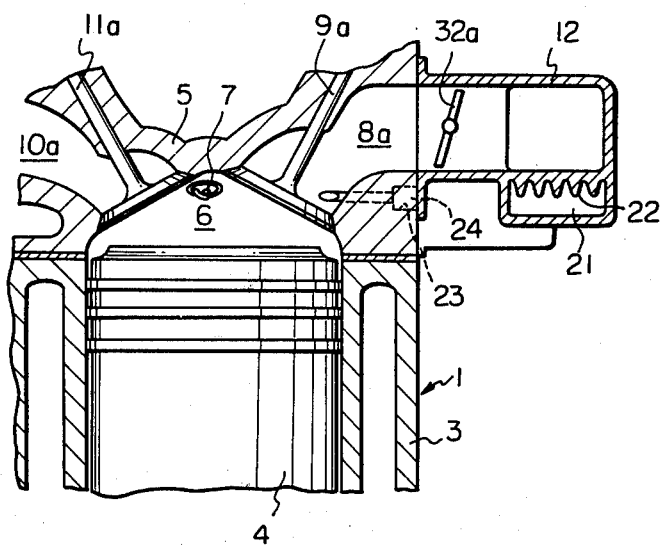
FIG. 2 is a cross-sectional side view taken along the line II—II in FIG. 1.
Figure 3:
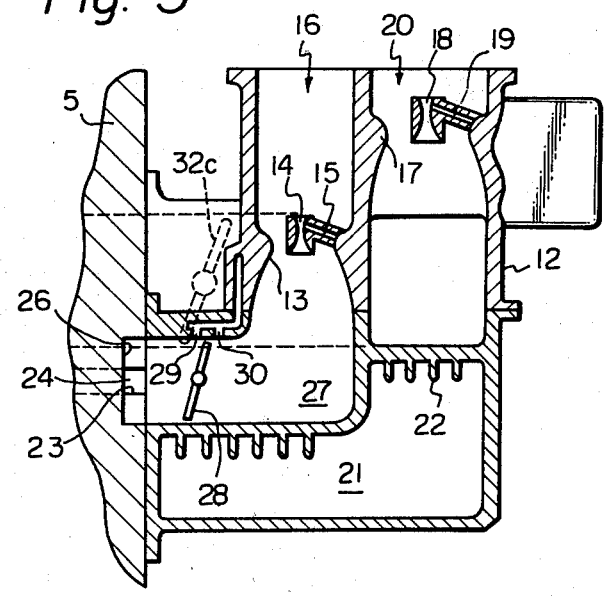
FIG. 3 is a cross-sectional side view taken along the line III—III in FIG. 1.

FIG. 1 illustrates the case wherein the present invention is applied to a four-cylinder engine. Referring to FIGS. 1 and 2, 1 designates an engine body, and 2a, 2b, 2c, 2d designate a No. 1 cylinder, a No. 2 cylinder, a No. 3 cylinder and a No. 4 cylinder, respectively; 3 designates a cylinder block, 4 a piston reciprocally movable in the cylinder block 3, 5 a cylinder head fixed onto the cylinder block 3, and 6 a combustion chamber formed between the piston 4 and the cylinder head 5; 7 designates a spark plug, and 8a, 8b, 8c, 8d designate intake ports formed in the cylinder head 5; 9a, 9b, 9c, 9d designate intake valves, 10a, 10b, 10c, 10d exhaust ports, 11a, 11b, 11c, 11d exhaust valves and 12 an intake manifold. As is illustrated in FIG. 3, a first fixed venturi type carburetor 16 and a second fixed venturi type carburetor 20 are arranged in the collecting portion of the intake manifold 12. The first fixed venturi type carburetor 16 comprises a large venturi 13, a small venturi 14 and a main nozzle 15, and the second fixed venturi type carburetor 20 comprises a large venturi 17, a small venturi 18 and a main nozzle 19. An exhaust gas flow chamber 21 is formed beneath the intake manifold 12 and, in addition, a plurality of fins 22 are formed on the lower wall of the intake manifold 12 for improving an efficiency of heating the mixture in the intake manifold 12 by the exhaust gas in the exhaust gas flow chamber 21.

As is illustrated in FIGS. 1 through 3, a groove 23 is formed on the outer wall of the cylinder head 5 and is covered by the mounting flange of the intake manifold 12 to form a distribution channel 24 having a small cross-sectional area within the groove 23. In addition, channel branches 25a, 25b, 25c, 25d, each having a small cross-sectional area and extending straight towards the corresponding intake ports 8a, 8b, 8c, 8d, are formed in the cylinder head 5 and are open on the inner wall of the intake ports 8a, 8b, 8c, 8d at a position near the valve head of the intake valves 9a, 9b, 9c, 9d, respectively. The opening of each of the channel branches 25a, 25b, 25c, 25d is directed to a valve gap formed between the valve head of the intake valve 9a, 9b, 9c, 9d and the valve seat thereof when the intake valve 9a, 9b, 9c, 9d opens. In addition, the opening of each of the channel branches 25a, 25b, 25c, 25d is orientated to the circumferential direction of the combustion chamber 6 so that, when the intake valve 9a, 9b, 9c, 9d opens, the mixture spouted from the channel branch 25a, 25b, 25c, 25d flows into the combustion chamber 6 through the above-mentioned valve gap, thereby causing a strong swirl motion in the combustion chamber 6. As is illustrated in FIG. 3, the distribution channel 24 has an enlarged groove portion 26 at the control portion thereof, and the enlarged groove portion 26 is connected to the air horn of the first carburetor 16 via a first intake passage 27 formed in the intake manifold 12. A primary throttle valve 28 is arranged in the first intake passage 27, and an idle fuel port 29 and a slow fuel port 30 are formed on the upper wall of the first intake passage 27. On the other hand, the intake manifold 12 comprises four manifold branches 31a, 31b, 31c, 31d defining therein a second intake passage, and the manifold branches 31a, 31b, 31c, 31d are connected to the intake ports 8a, 8b, 8c, 8d, respectively. As is illustrated in FIGS. 1 through 3, secondary throttle valves 32a, 32b, 32c, 32d are arranged in the manifold branches 31a, 31b, 31c, 31d at a position near the intake ports 8a, 8b, 8c, 8d, that is, at the outlets of the manifold branches 31a, 31b, 31c, 31d, respectively. From FIGS. 1 through 3, it will be understood that the cross-sectional area of the first intake passage 27 is slightly smaller than that of the manifold branches 31a, 31b, 31c, 31d and, in addition, both cross-sectional areas of the distribution channel 24 and the channel branch 25a, 25b, 25c, 25d are very much smaller than that of the manifold branch 31a, 31b, 31c, 31d.

Figure 5:
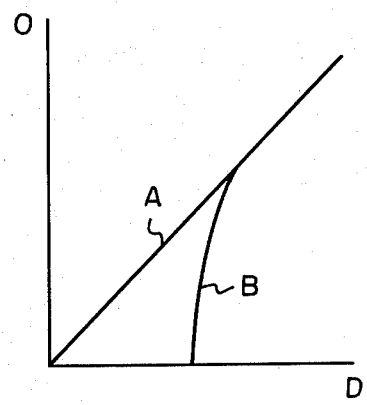
FIG. 5 is a graph showing changes in the opening degree of the primary and the secondary throttle valves.

FIG. 5 shows changes in opening degree of the primary throttle valve 28 and the secondary throttle valves 32a, 32b, 32c, 32d. In FIG. 5, the ordinate O indicates opening degree, and the abscissa D indicates depression of the accelerator pedal (not shown). In addition, in FIG. 5, the line A indicates opening degree of the primary throttle valve 28, and the line B indicates opening degree of the secondary throttle valves 32a, 32b, 32c, 32d. From FIG. 5, it will be understood that the opening degree of the primary throttle valve 28 is increased in proportion to an increase in the depression of the accelerator pedal and, in addition, the secondary throttle valves 32a, 32b, 32c, 32d open after the opening degree of the primary throttle valve 28 is increased beyond a predetermined opening degree.

Figure 4:
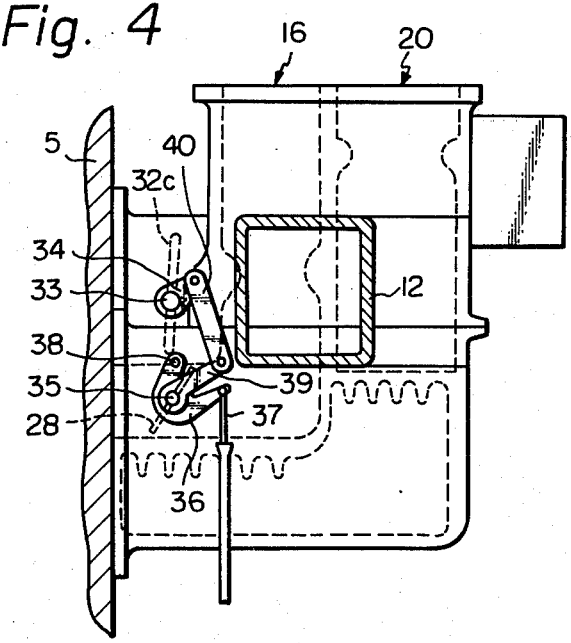
FIG. 4 is a side view of a link mechanism for actuating the primary and the secondary throttle valves.

FIG. 4 illustrates an example of a valve actuating mechanism capable of obtaining the opening degree shown in FIG. 5. Referring to FIG. 4, reference numeral 33 designates a secondary throttle shaft common to the secondary throttle valves 32a, 32b, 32c, 32d; 34 designates an arm fixed onto the secondary throttle shaft 33, 35 a primary throttle shaft of the primary throttle valve 28 and 36 a lever fixed onto the primary throttle shaft 35. One of the ends of the lever 36 is connected to the accelerator pedal via a wire 37 and the other end of the lever 36 has a projecting pin 38 fixed thereonto. On the other hand, an arm 39 is rotatably mounted on the primary throttle shaft 35, and the tip of the arm 39 of the tip of the arm 34 are interconnected to each other by means of a link 40. The secondary throttle valves 32a, 32b, 32c, 32d are always urged in the counterclockwise direction by means of a spring (not shown) and, consequently, the secondary throttle valves 32a, 32b, 32c, 32d are normally positioned at a closed position, in which they completely close the manifold branches 31a, 31b, 31c, 31d, as shown in FIG. 4. When the accelerator pedal is depressed, the lever 36 is rotated in the clockwise direction and, thus, the primary throttle valve 28 is opened. When the accelerator pedal is further depressed, the projecting pin 38 of the lever 36 comes into engagement with the arm 39 and, as a result, the arm 39 is rotated in the clockwise direction. Thus, the secondary throttle valves 32a, 32b, 32c, 32d are opened.

As is shown in FIG. 5, when an engine is operating under a light load, only the primary throttle valve 28 is opened. Consequently, at this time, the mixture formed in the first carburetor 16 is spouted into the combustion chamber 6 from the channel branch 25a, 25b, 25c, 25d via the first intake passage 27, the primary throttle valve 28 and the distribution channel 24 when the intake valve 9a, 9b, 9c, 9d opens. As mentioned previously, the distribution channel 24 and the channel branches 25a, 25b, 25c, 25d have an extremely small cross-sectional area is compared with that of the manifold branches 31a, 31b, 31c, 31d and, thus, the mixture formed in the first carburetor 16 is caused to flow at a high speed in the distribution channel 24 and the channel branches 25a, 25b, 25c, 25d. As a result of this, the flow energy is added to the mixture during the time the mixture flows in the distribution channel 24 and the channel branches 25a, 25b, 25c, 25c, and thus, the vaporization of the liquid fuel contained in the mixture is promoted. In addition, as mentioned previously, a strong swirl motion, as shown by the arrow W in FIG. 1, is caused in the combustion chamber 6 by the mixture spouted from the channel branches 25a, 25b, 25c, 25d and, as a result, the burning velocity is considerably increased.

On the other hand, the shapes of the intake ports 8a, 8b, 8c, 8d are so constructed that the flow resistance which the mixture flowing therein is subjected to is as small as possible. Consequently, when the accelerator pedal is depressed and, thus, the secondary throttle valves 32a, 32b, 32c, 32d are opened, a large part of the mixture flows from the second carburetor 20 into the combustion chamber 6 via the manifold branches 31a, 31b, 31c, 31d, having an extremely small flow resistance, and via the intake ports 8a, 8b, 8c, 8d, also having an extremely small flow resistance. As a result of this, when an engine is operating at a high speed under a heavy load, a high volumetric efficiency can be ensured and, at the same time, a satisfactory high burning velocity can be ensured by the turbulence spontaneously generating in the combustion chamber 6.

As is illustrated in FIGS. 1 through 3, since the secondary throttle valves 32a, 32b, 32c, 32d are arranged in the manifold branches 31a, 31b, 31c, 31d at the outlets of the manifold branches 31a, 31b, 31c, 31d, the volume of the intake passage located downstream of the secondary throttle valves 32a, 32b, 32c, 32d is small and, as a result, the responsiveness of an engine to the depressing of the accelerator pedal can be improved. In addition, since the inner surface area of the intake passage located downstream of the secondary throttle valves 32a, 32b, 32c, 32d becomes small, the amount of fuel adhering onto the inner surface of the intake passage located downstream of the secondary throttle valves 32a, 32b, 32c, 32d is reduced. As a result of this, it is possible to prevent the mixture fed into the cylinders from becoming excessively rich at the time of deceleration. Furthermore, since the intake interference between the cylinders is prevented by arranging the secondary throttle valves 32a, 32b, 32c, 32d in the manifold branches 31a, 31b, 31c, 31d, the distribution of fuel to each cylinder becomes uniform.

According to the present invention, the burning velocity can be considerably increased due to the creation of a strong swirl motion in the combustion chamber and due to the promotion of vaporization of fuel when an engine is operating under a light load, while ensuring a high volumetric efficiency when an engine is operating at a high speed under a heavy load. In addition, by arranging the secondary throttle valves at the outlet of the manifold branches, the responsiveness of an engine to the depressing of the accelerator pedal and the distribution of fuel to each cylinder can be improved and, in addition, the amount of unburned HC in the exhaust gas can be reduced at the time of deceleration.

While the invention has been described by reference to specific embodiments chosen for purposes of illustration, it should be apparent that numerous modifications could be made thereto by those skilled in the art without departing from the spirit and scope of the invention.

What is claimed is:

1. A multi-cylinder internal combustion engine having a plurality of cylinders, each having a combustion chamber and an intake valve, said engine comprising:
    a main intake passage common to at least two cylinders and comprising an inlet and at least two main branch intake passages branched off from said main intake passage, each of said main branch intake passages being connected to the respective combustion chamber via the corresponding intake valve;
    main fuel supply means arranged in the inlet of said main intake passage;
    an auxiliary intake passage common to said two cylinders and comprising an inlet and at least two auxiliary branch intake passages branched off from said auxiliary intake passage, each of said auxiliary branch intake passages having an outlet which opens into the respective main branch passage at a place near the valve gap formed between the corresponding intake valve and a valve seat thereof when the intake valve is open, the outlet being directed in the circumferential direction of the corresponding combustion chamber;
    auxiliary fuel supply means arranged in the inlet of said auxiliary intake passage;
    primary valve means arranged in said auxiliary intake passage and opened in accordance with increase in level of the load of an engine; and
    secondary valve means arranged in said main branch intake passages and operatively connected to said primary valve means for opening said secondary valve means after the opening degree of said primary valve means is increased beyond a predetermined opening degree.

2. A multi-cylinder internal combustion engine as claimed in claim 1, wherein each of said auxiliary branch intake passages has a cross-section which is smaller than that of said main branch intake passage.

3. A multi-cylinder internal combustion engine as claimed in claim 1, wherein said auxiliary intake passage has a cross-section which is smaller than that of said main branch intake passage.

4. A multi-cylinder internal combustion engine as claimed in claim 1, wherein said engine further comprises a cylinder head and at least one intake manifold forming a part of said main branch intake passages therein, a part of said auxiliary branch intake passages being formed between said cylinder head and said intake manifold.

5. A multi-cylinder internal combustion engine as claimed in claim 4, wherein said auxiliary intake passage is formed in said intake manifold.

6. A multi-cylinder internal combustion engine as claimed in claim 4, wherein the remaining part of said auxiliary branch intake passages is formed in said cylinder head.

7. A multi-cylinder internal combustion engine as claimed in claim 4, wherein said intake manifold has on its lower portion an exhaust gas flow chamber.

8. A multi-cylinder internal combustion engine as claimed in claim 1, wherein said primary valve means comprises at least one primary throttle valve.

9. A multi-cylinder internal combustion engine as claimed in claim 8, wherein said auxiliary intake passage has an inner wall forming thereon an idle fuel port and a slow fuel port in the vicinity of said primary intake valve, said idle fuel port and said slow fuel port cooperating with said primary throttle valve.

10. A multi-cylinder internal combustion engine as claimed in claim 1, wherein said secondary valve means comprises at least two secondary throttle valves, each being arranged in the respective main branch intake passages.

11. A multi-cylinder internal combustion engine as claimed in claim 10, wherein said secondary throttle valves are fixed onto a common throttle shaft.

12. A multi-cylinder internal combustion engine as claimed in claim 10, wherein each of said secondary throttle valves is arranged at a position near said intake valve.

13. A multi-cylinder internal combustion engine as claimed in claim 12, wherein said engine further comprises at least one intake manifold having at least two outlets, each of said secondary throttle valves being arranged at a respective outlet of said intake manifold.

14. A multi-cylinder internal combustion engine as claimed in claim 1, wherein said engine further comprises link means mechanically interconnecting said primary valve means with said secondary valve means for opening said secondary valve means after the opening degree of said primary valve means is increased beyond a predetermined opening degree.

15. A multi-cylinder internal combustion engine as claimed in claim 14, wherein said link means comprises a rotatable first arm connected to said primary valve means, a rotatable second arm connected to said secondary valve means, a link interconnecting said first arm with said second arm, and a rotatable lever rotated in accordance with the increase in the level of the load of an engine and being arranged to be engageable with said first arm.

16. A multi-cylinder internal combustion engine as claimed in claim 1, wherein said main fuel supply means comprises a carburetor.

17. A multi-cylinder internal combustion engine as claimed in claim 1, wherein said auxiliary fuel supply means comprises a carburetor.

18. A multi-cylinder internal combustion engine having a plurality of cylinders, each having a combustion chamber and an intake valve, said engine comprising:
   a main intake passage common to at least two cylinders and comprising an inlet and at least two main branch intake passages branched off from said main intake passage, each of said main branch intake passages being connected to the respective combustion chamber via the corresponding intake valve;
   main fuel supply means arranged in the inlet of said main intake passage;
   an auxiliary intake passage common to said two cylinders and comprising an inlet and at least two auxiliary branch intake passages branched off from said auxiliary intake passage, each of said auxiliary branch intake passages having an outlet which opens into the respective main branch passage at a place near the valve gap formed between the corresponding intake valve and a valve seat thereof when the intake valve is open, the outlet being directed in the circumferential direction of the corresponding combustion chamber;
   auxiliary fuel supply means arranged in the inlet of said auxiliary intake passage;
   primary valve means arranged in said auxiliary intake passage and opened in accordance with increase in level of the load of an engine; and
   secondary valve means having at least two secondary throttle valves, which valves are mechanically connected and disposed in respective main branch intake passages near the respectively corresponding intake valves.

19. A multi-cylinder internal combustion engine as claimed in claim 21, wherein said engine further comprises link means mechanically interconnecting said primary valve means with said secondary valve means for opening said secondary valve means after the opening degree of said primary valve means is increased beyond a predetermined opening degree.

20. A multi-cylinder internal combustion engine having a plurality of cylinders, each having a combustion chamber and an intake valve, said engine comprising:
   a main intake passage common to at least two cylinders and comprising an inlet and at least two main branch intake passages branched off from said main intake passages branched off from said main intake passage, each of said main branch intake passages being connected to the respective combustion chamber via the corresponding intake valve;
   main fuel supply means arranged in the inlet of said main intake passage;
   an auxiliary intake passage having an inner wall forming therein an idle fuel port and a slow fuel port in the vicinity of a primary valve, said idle fuel port and said slow fuel port cooperating with said primary valve;
   auxiliary fuel supply means arranged in the inlet of said auxiliary intake passage;
   primary valve means arranged in said auxiliary intake passage having at least one primary throttle valve which is opened in accordance with increase in level of the load of an engine; and
   secondary valve means arranged in said main branch intake passages and operatively connected to said primary valve means for opening said secondary valve means after the opening degree of said primary valve means is increased beyond a predetermined opening degree.

* * * * *

UNITED STATES PATENT AND TRADEMARK OFFICE
CERTIFICATE OF CORRECTION

PATENT NO. : 4,256,063
DATED : March 17, 1981
INVENTOR(S) : Masaharu Sumiyoshi, et al It is certified that error appears in the above—identified patent and that said Letters Patent is hereby corrected as shown below:

Col. 1, line 44, after "incomplete" delete ";".

Col. 4, line 11, change "of" to --and--.

Col. 4, line 36, change "is" to --as--.

Col. 4, line 44, change "25c" to --25d-- second occurrence.

Col. 8, line 4, change "21" to --18--.

Col. 8, line 15, delete "branched off from said main"

Col. 8, line 16, delete "intake passages".

Signed and Sealed this

Sixteenth Day of June 1981

[SEAL]

Attest:

RENE D. TEGTMEYER

*Attesting Officer*     *Acting Commissioner of Patents and Trademarks*

Notice of Adverse Decision in Interference

In Interference No. 100,770, involving Patent No. 4,256,063, M. Sumiyoshi, S. Sekiya and K. Motosugi, INTAKE SYSTEM OF A MULTI-CYLINDER INTERNAL COMBUSTION ENGINE, final judgment adverse to the patentees was rendered May 25, 1982, as to claims 1-3, 8-10 and 14-20.

[*Official Gazette August 17, 1982.*]